Patented Apr. 17, 1951

2,549,745

UNITED STATES PATENT OFFICE 2,549,745

CATION-EXCHANGE PRODUCT AND PROCESS OF MAKING SAME

Frederick A. Hessel and William B. Canfield, Montclair, N. J., assignors, by direct and mesne assignments, of one-half to Montclair Research Corporation, a corporation of New Jersey, and one-half to Ellis-Foster Company, a corporation of New Jersey No Drawing. Application June 11, 1949, Serial No. 98,645

12 Claims. (Cl. 260—97)

This invention relates to new and improved resinous base-exchange materials. More particularly, it relates to the preparation of an activated resin base-exchange material which is not only useful for purifying and softening water but also for the removal of various other dissolved substances from dilute aqueous solutions. The invention relates specifically to a new type of base-exchange material derived from wallaba resin, and to a method of making it. The important aspect of the present process is the removal of calcium and/or magnesium ions from hard water.

The chief ingredient used in making the base-exchange product is the resinous material of the wallaba tree *Eperua falcata*. The forests of British Guiana contain large and fairly pure stands of wallaba trees. Wallaba wood is characterized by the fact that it contains a reddish resinous substance present to the extent of about 25%. This resin is exceedingly complex in composition. It becomes insoluble and infusible in the presence of aldehyde or aldehyde-containing substances and heat, a characteristic which may be indicative of the presence of phenolic bodies. It does not appear to be related to rosin or other natural resin and does not dissolve when heated with drying oils such as linseed oil. The resin is soluble in ethyl alcohol and acetone but insoluble in hydrocarbons. It is also very soluble in dilute aqueous sodium carbonate or sodium hydroxide solution.

The resin may be separated from the wood most easily by extraction with hot ethyl alcohol and it is recovered from the solution by evaporation of the solvent. It is a hard, brittle, dark red product, which initially softens on heating but does not melt completely without decomposition. The resin may be separated from the wood also by repeated extraction with dilute aqueous sodium carbonate or sodium hydroxide solution. When the alkaline solution is neutralized with dilute acid a finely divided resin precipitates which may be filtered off, washed, and dried.

The products of the present invention are made by treating wallaba resin or wallaba resin material with a concentrated inorganic acid, preferably concentrated sulfuric acid. The reaction may be carried out in various ways. Thus, concentrated sulfuric acid is allowed to react with (a) wallaba resin alone, (b) wallaba resin in the presence of an aldehyde or aldehyde-compound, or (c) a wallaba resin-aldehyde reaction product. When concentrated sulfuric acid is reacted with wallaba resin in the presence of an aldehyde or an aldehyde-compound, the three ingredients may be mixed, or the aldehyde may be mixed with the acid prior to addition to the resin, or the aldehyde may be mixed with the resin prior to addition to the acid. Suitable aldehydes and aldehyde-compounds are formaldehyde, paraformaldehyde, hexamethylenetetramine, furfural, acetaldehyde and the like. The amount of aldehyde is not critical but in any case it is less than 30% of the mixture of resin and aldehyde. Paraformaldehyde is advantageously mixed with the concentrated acid and wallaba resin added to the mixture. On the other hand, furfural is best when mixed with the resin and the mixture added to the acid. When aqueous formaldehyde is used it is reacted with wallaba resin to form a wallaba resin-aldehyde reaction product prior to the sulfuric acid treatment.

In practising the invention, one part of wallaba resin (or other wallaba resin material as mentioned above) is treated with from 1 to 4 parts of sulfuric acid of specific gravity about 1.86 and allowed to react for from ½ to 4 hours at 80°–120° C. The reaction between wallaba resin and concentrated sulfuric acid is exothermic and the mass tends to heat up. However, the temperature is controlled so that the reaction mixture is maintained at preferably 80°–90° C. A certain amount of charring, dehydration, sulfonation and oxidation occurs to give a dark brown to black brittle mass. This is dumped into a large volume of water. The lumps are broken up and screened to a desired size (for example, to pass through a 20-mesh screen onto a 40-mesh screen) and finally washed until free of acid. The washed material is then allowed to stand in contact with a dilute (e. g., 2%) aqueous sodium carbonate solution to remove any unreacted resin. After further washing with water to remove the alkali, the granules are partially dried so that a given weight of material contains preferably 50% to 100% of water. Resins having cation-exchange properties may also be made in other ways; for example, by use of more dilute acids. However, the exchange capacity of such resins appears to be generally lower than that of resins prepared with concentrated sulfuric acid.

The washed and partially died product may be employed as such or it may be subjected to several cycles of exhaustion and subsequent regeneration with dilute acid or concentrated sodium chloride brine solution. This treatment, however, is not necessary since the materials of the present invention exhibit excellent ion-exchange properties. Such properties do not appear to be substantially changed by repeated exhaustion and regeneration.

The material is placed in a suitable container equipped to permit the passage of water through it either in a backward or a forward manner. The passage of water through the column in a backward manner helps to eliminate fines from the bed before permitting the solution containing the cation (such as calcium, magnesium and the like) to filter through. Hard water containing, say, 500 parts per million of calcium ions, when passed through a bed of the products of the present invention, has its hardness removed. Calcium cations are replaced with sodium or hydrogen according to whether the material has been previously treated with a sodium salt solution or an acid.

The products of the present invention may be modified to alter their ion-exchange capacities in several ways without departing from the scope of the invention. For instance, phenol or phenol bodies may be employed to partially replace the Wallaba resin. Such a modification is not generally advantageous since the products therefrom are substantially more soluble in dilute sodium carbonate solutions. When wallaba resin is first reacted with an aldehyde or an aldehyde-containing compound to secure an alkali-insoluble resin and the dried and powdered material is subsequently treated with concentrated sulfuric acid to improve the ion exchange properties thereof, the reaction between wallaba resin and aldehyde compound may be caused to take place in a medium of alcohol or dilute aqueous sodium carbonate, whichever procedure is most fitting to the manufacturer.

The following examples are illustrative of the invention and should not be considered as limiting its scope. All proportions given herein are in parts by weight.

*Example 1.*—Sixty parts of powdered wallaba resin are placed in a 600-ml. beaker immersed in a water bath. Two hundred forty parts of concentrated sulfuric acid (specific gravity=1.86) are added with rapid stirring while maintaining the temperature at 80°–90° C. The reaction mixture heats up rapidly and becomes very dark. After 4 hours at this temperature the batch is poured into a large volume of water and washed. It is ground to pass through a 20-mesh screen onto a 40-mesh screen. The ground material is then suspended in 2% aqueous sodium carbonate solution, washed, and partially dried. The screenings which pass through a 20-mesh screen onto a 40-mesh screen are placed in a glass tube 1 inch in diameter to form a column 10 inches high. Distilled water is passed through the material until the effluent is free of alkali and coloring matter. The ion-exchange material is now ready for use.

A solution of calcium chloride containing 350.2 P. P. M. of hardness (calculated as calcium carbonate) is passed through the column. A total of 1800 ml. of water are thus softened. Since 8.5 grams of dry ion-exchange resin are employed, the bed possesses a capacity of 72.8 mgms. of calcium carbonate per gram of ion-exchange resin.

*Example 2.*—Thirty parts of powdered wallaba resin are placed in a 250-ml. beaker immersed in a water bath. Thirty parts of concentrated sulfuric acid (specific gravity=1.86) are added with rapid stirring while maintaining the temperature at 80°–90° C. The reaction mixture heats up rapidly and becomes very dark. After 4 hours at this temperature the batch is poured into a large volume of water and washed. It is then ground to pass through a 20-mesh screen onto a 40-mesh screen. The ground material is then suspended in 2% aqueous sodium carbonate solution, washed and partially dried. This material is placed in a glass tube 1 inch in diameter to form a column 10 inches high. Distilled water is passed through the material until it is free of alkali and coloring matter. The ion-exchange material is now ready for use.

A solution of calcium chloride containing 350.2 P. P. M. of hardness (calculated as calcium carbonate) is passed through the column. A total of 1700 ml. of water are thus softened. Since 11.0 parts of dry ion-exchange resin are employed, the bed possesses a capacity of 54.1 mgms. of calcium carbonate per gram of ion-exchange resin.

*Example 3.*—Fifty parts of powdered wallaba resin are placed in a 400-ml. beaker immersed in a water bath. One hundred parts of concentrated sulfuric acid (specific gravity=1.86) are added with rapid stirring while maintaining the temperature at 80°–90° C. The reaction mixture heated up rapidly and became very dark. After 4 hours at this temperature the batch is poured into a large volume of water and washed. It is then ground to pass through a 20-mesh screen onto a 40-mesh screen. The ground material is suspended in 2% aqueous sodium carbonate solution, washed, and partially dried. The screenings which pass through a 20-mesh screen onto a 40-mesh screen are placed in a tube 1 inch in diameter to form a column 10 inches high. Distilled water is passed through the material until it is free of alkali and coloring matter. The ion-exchange material is now ready for use.

A solution of calcium chloride containing 350.2 P. P. M. of hardness (calculated as calcium carbonate) is passed through the column. A total of 750 ml. of water are thus softened. Since 4.69 grams of dry ion-exchange resin are employed, the bed possesses a capacity of 51.8 mgms. of calcium carbonate per gram of ion-exchange resin.

*Example 4.*—Fifty parts of powdered wallaba resin are placed in a 600-ml. beaker immersed in a water bath. A mixture of 5 parts of paraformaldehyde in 95 parts of concentrated sulfuric acid (specific gravity=1.86) is added with rapid stirring while maintaining the temperature at 80°–90° C. The reaction mixture heated up rapidly and becomes very dark. After 4 hours at this temperature the batch is poured into a large volume of water and washed. It is then ground to pass through a 20-mesh screen onto a 40-mesh screen. The ground material is then suspended in 2% aqueous sodium carbonate, washed, and partially dried. The screenings which pass through a 20-mesh screen onto a 40-mesh screen are placed in a tube 1 inch in diameter to form a column 10 inches high. Distilled water is passed through the material until it is free of alkali and coloring matter. The ion-exchange material is now ready for use.

A solution of calcium chloride containing 350.2 P. P. M. of hardness (calculated as calcium carbonate) is passed through the column. A total of 3500 ml. of water are thus softened. Since 13.0 grams of dry ion-exchange resin are employed, the bed possesses a capacity of 94.6 mgms. of calcium carbonate per gram of ion-exchange resin.

A commercial synthetic cation-exchange resin (Amberlite IR 100) was tested against the same calcium chloride solution in the same way. It showed a capacity of 89.6 mgms. calcium carbonate per gram.

*Example 5.*—Fifty parts of powdered wallaba resin are placed in a 600-ml. beaker which is immersed in a water bath. A mixture of 10 parts of paraformaldehyde in 240 parts of concentrated sulfuric acid (specific gravity=1.86) is added with rapid stirring while maintaining the temperature at 80°–90° C. The reaction mixture heats up rapidly and becomes very dark. After 4 hours at 80°–90° C. the batch is poured into a large volume of water and then washed, after which it is ground to pass through a 20-mesh screen onto a 40-mesh screen. The ground material is then suspended in 2% aqueous sodium carbonate, washed, and partially dried. The screened resin is placed in a tube 1 inch in diameter to form a column 10 inches high. Distilled water is passed through the material until the effluent is free of alkali and colored matter. The ion-exchange material is now ready for use.

A solution of calcium chloride containing 350.2 P. P. M. of hardness (calculated as calcium carbonate) is passed through the column. A total of 2700 ml. of water are thus softened. Since 11.0 grams of dry ion-exchange resin are employed, the bed possesses a capacity of 85.9 mgms. of calcium carbonate per gram of ion-exchange resin.

*Example 6.*—Twenty-five parts of wallaba resin and 25 parts of phenol are ground together to form an intimate mixture and placed in a 600-ml. beaker.

A mixture of 10 parts of paraformaldehyde in 200 parts of concentrated sulfuric acid (specific gravity=1.86) is added with rapid stirring while maintaining the temperature at 80°–90° C. The reaction mixture heats up rapidly and becomes very dark. After 4 hours at 80°–90° C. the batch is poured into a large volume of water and then washed. It is then ground to pass through a 20-mesh screen onto a 40-mesh screen. The ground material is then suspended in 2% aqueous sodium carbonate, washed and partially dried. The screenings which pass through a 20-mesh screen onto a 40-mesh screen are placed in a tube 1 inch in diameter to form a column 10 inches high. Distilled water is passed through the column until the product is free of alkali and colored matter. The ion-exchange material is now ready for use.

A solution of calcium chloride containing 350.2 P. P. M. of hardness (calculated as calcium carbonate) is passed through the column. A total of 2800 ml. of water are thus softened. Since 11.6 grams of dry ion-exchange resin are employed, the bed possesses a capacity of 84.7 mgms. of calcium carbonate per gram of ion-exchange resin.

*Example 7.*—Fifty parts of powdered wallaba resin are placed in a 600-ml. beaker which is placed in a water bath. A mixture of 7.5 parts of paraformaldehyde and 192.5 parts of concentrated sulfuric acid (specific gravity=1.86) are added with rapid stirring while maintaining the temperature at 80°–90° C. The reaction mixture heats up rapidly and becomes very dark. After 4 hours at this temperature the batch is poured into a large volume of water and washed. It is ground to pass through a 20-mesh screen onto a 40-mesh screen. The ground material is then suspended in 2% aqueous sodium carbonate solution, washed, and partially dried. The screenings which pass through a 20-mesh screen onto a 40-mesh screen are placed in a glass tube 1 inch in diameter to form a column 10 inches high. Distilled water is passed through the material until it is free of alkali and coloring matter. The ion-exchange material is now ready for use.

A solution of magnesium sulphate containing 454.5 P. P. M. of hardness (calculated as magnesium carbonate) is passed through the column. A second column of ion-exchange material from a commercial synthetic sulfonated resin known as Amberlite IR 100 was also treated with the above hard water. Each 50 ml. portion of effluent was examined as in the previous examples, but in this case with a 5% solution of 5 cc. sodium phosphate made alkaline with concentrated ammonia. In each case after a breakthrough point was observed the columns were regenerated with 10% aqueous brine solution and the cycle repeated. The bed capacities were thus determined as the number of mgms. of magnesium carbonate absorbed by one gram of ion-exchange resin, and were as follows:

|  | Example 8 | Amberlite IR 100 |
|---|---|---|
|  | *Milligrams* | *Milligrams* |
| Initial | 109.1 | 111.8 |
| After 1st regeneration | 111.8 | 117.3 |
| After 2nd regeneration | 102.7 | 114.5 |

*Example 8.*—Thirty parts of powdered wallaba resin and 60 parts of ethanol are refluxed together at boiling to form a clear solution. Three parts of hexamethylenetetramine are now added and refluxing continued for 2 hours. The resulting insoluble product is filtered, dried and powdered. The powdered material is placed in a 400-ml. beaker cooled by means of a water bath. One hundred twenty-five parts (ratio of 1 to 4) of concentrated sulfuric acid are added and the mixture agitated at 90°–110° C. for 4 hours. The reaction mixture is then poured into a large volume of water, washed, ground, and screened. After treatment with dilute aqueous sodium carbonate solution and subsequent washing the material is now ready for use. A column is prepared and treated with calcium chloride solution (350.2 P. P. M. calculated as calcium carbonate) as in the previous examples. 2500 ml. of water are thus softened. The material possesses a bed capacity of 84.2 mgms. of calcium carbonate per gram of ion exchange material.

*Example 9.*—Fifty parts of wallaba resin, 5 parts of sodium carbonate, and 95 parts of water are warmed together to form a clear solution, the pH of which is adjusted to 7. Fifty parts of 36½% aqueous formaldehyde are added and the reaction mixture refluxed at 80°–90° C. for 15 minutes. A solid gel-like mass is formed which is broken up, dried and powdered. 175 parts (ratio of 1 to 4) of concentrated sulfuric acid are added and the mixture agitated at 80°–90° C. for 4 hours. The reaction mixture is then poured into a large volume of water, washed, ground, and screened. After treatment with dilute aqueous sodium carbonate and subsequent washing the material is now ready for use. A column is prepared and treated with calcium chloride solution (350.2 P. P. M. calculated as calcium carbonate) as in the previous example. The material possesses a bed capacity of 77 mgms. of calcium carbonate per gram of ion-exchange material.

*Example 10.*—Thirty parts of powdered wallaba resin and 30 parts of ethanol are warmed together under reflux to form a clear solution. Thirty parts of a 36½% aqueous solution of formaldehyde and 1 part of concentrated sulphuric acid solution are added and the reaction mixture is heated to boiling under reflux. A reddish resinous mass precipitates from solution and thereafter refluxing is continued for 2 hours. The insoluble resinous material is filtered, suspended in 2% aqueous sodium carbonate solution, washed free of alkali, and screened. The screenings which pass through a 20-mesh screen onto a 40-mesh screen are separated and placed in a glass tube 1 inch in diameter to form a column 10 inches high. Distilled water is passed through the material until it is free of alkali and coloring matter. The ion-exchange material is now ready for use.

A solution of calcium chloride containing 350.2 P. P. M. of hardness (calculated as calcium carbonate) is passed through the column. Each 50 ml. portion of effluent is tested with a 2½% solution of ammonium oxalate to determine at which stage cloudiness appears, indicating a break-through of the hard water. At the point of cloudiness, the column no longer is removing hardness. A total of 400 ml. of water is thus softened. Since 5.1 grams of dry ion-exchange resin are employed, the material possesses a capacity of 27.5 mgms. of calcium carbonate per gram of ion-exchange material.

*Example 11.*—Fifty parts of wallaba resin, 5 parts of sodium carbonate, and 95 parts of water are warmed together to form a clear solution. The solution is neutralized to a pH of 7 and a solution of 63.2 parts of sodium bisulphite in 50 parts of 36½% aqueous formaldehyde is added. The reaction mixture is refluxed for 3 hours at 80°–90° C., and the insoluble resin thus formed is separated by filtration. It is washed with diluted aqueous sodium carbonate solution and screened.

A bed of the ion-exchange material is prepared in the usual manner and treated with aqueous calcium chloride solution containing 350.2 P. P. M. hardness (calculated as calcium carbonate). The ion-exchange material possesses a bed capacity of 42.8 mgms. of calcium carbonate per gram.

We claim:

1. A cation-exchange resinous material comprising the reaction product of concentrated sulfuric acid and material selected from the group consisting of (a) wallaba resin, (b) a reaction product of wallaba resin and a compound selected from the group consisting of formaldehyde, paraformaldehyde, hexamethylenetetramine, furfural and acetaldehyde, and (c) a mixture of wallaba resin and a compound selected from the group consisting of formaldehyde, paraformaldehyde, hexamethylenetetramine, furfural and acetaldehyde.

2. A cation-exchange resinous material comprising the reaction product of concentrated sulfuric acid and wallaba resin.

3. A cation-exchange resinous material comprising the reaction product of concentrated sulfuric acid and a reaction product of wallaba resin and a compound selected from the group consisting of formaldehyde, paraformaldehyde, hexamethylenetetramine, furfural and acetaldehyde.

4. A cation-exchange resinous material comprising the reaction product of concentrated sulfuric acid and a wallaba resin-formaldehyde reaction product.

5. A cation-exchange resinous material comprising the reaction product of concentrated sulfuric acid and a mixture of wallaba resin and a compound selected from the group consisting of formaldehyde, paraformaldehyde, hexamethylenetetramine, furfural and acetaldehyde.

6. A cation-exchange resinous material comprising the reaction product of concentrated sulfuric acid and a mixture of wallaba resin and paraformaldehyde.

7. The process of making a cation-exchange resinous material which comprises heating, for from ½ to 4 hours at 80°–120° C., 1 to 4 parts of concentrated sulfuric acid with one part of material selected from the group consisting of (a) wallaba resin, (b) a reaction product of wallaba resin and a compound selected from the group consisting of formaldehyde, paraformaldehyde, hexamethylenetetramine, furfural and acetaldehyde, and (c) a mixture of wallaba resin and a compound selected from the group consisting of formaldehyde, paraformaldehyde, hexamethylenetetramine, furfural and acetaldehyde.

8. The process of making a cation-exchange resinous material which comprises heating, for from ½ to 4 hours at 80°–120° C., 1 to 4 parts of concentrated sulfuric acid with 1 part of wallaba resin.

9. The process of making a cation-exchange resinous material which comprises heating, for from ½ to 4 hours at 80°–120° C., 1 to 4 parts of concentrated sulfuric acid with 1 part of a reaction product of wallaba resin and a compound selected from the group consisting of formaldehyde, paraformaldehyde, hexamethylenetetramine, furfural and acetaldehyde.

10. The process of making a cation-exchange resinous material which comprises heating, for from ½ to 4 hours at 80°–120° C., 1 to 4 parts of concentrated sulfuric acid with 1 part of a wallaba resin-formaldehyde reaction product.

11. The process of making a cation-exchange resinous material which comprises heating, for from ½ to 4 hours at 80°–120° C., 1 to 4 parts of concentrated sulfuric acid with 1 part of a mixture of wallaba resin and a compound selected from the group consisting of formaldehyde, paraformaldehyde, hexamethylenetetramine, furfural and acetaldehyde.

12. The process of making a cation-exchange resinous material which comprises heating, for from ½ to 4 hours at 80°–120° C., 1 to 4 parts of concentrated sulfuric acid with 1 part of a mixture of wallaba resin and paraformaldehyde.

FREDERICK A. HESSEL.
WILLIAM B. CANFIELD.

No references cited.